H. M. BAKER.
Making Alkalies.
No. 55,600.  Patented June 19, 1866.
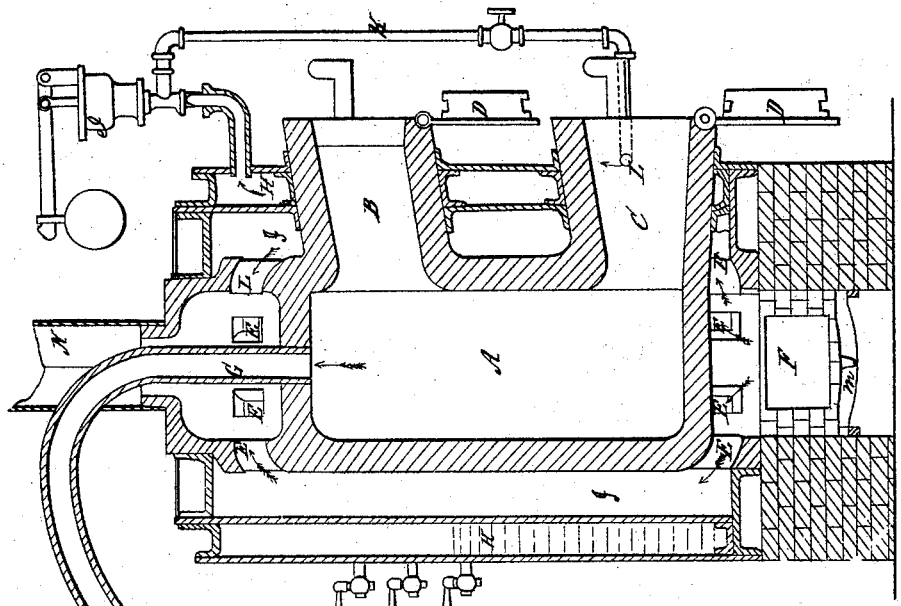
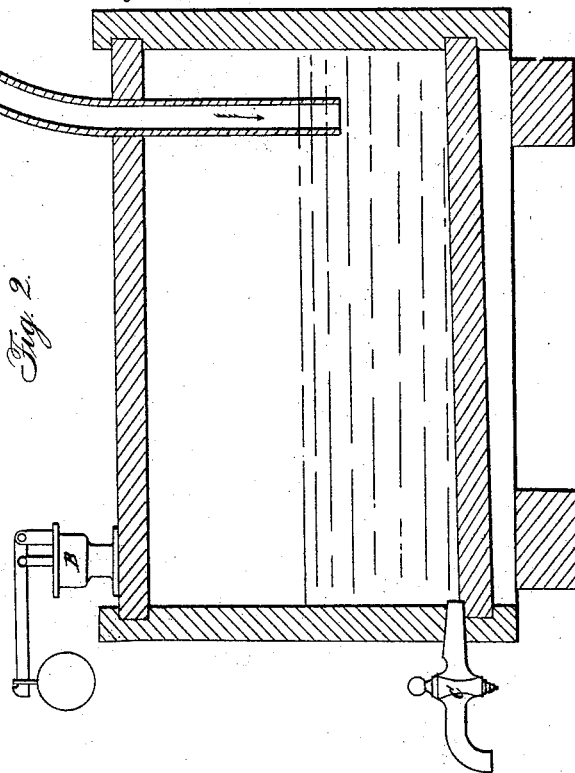
Witnesses:
Inventor:

UNITED STATES PATENT OFFICE.

HAYDN M. BAKER, OF ROCHESTER, NEW YORK.

IMPROVEMENT IN THE MANUFACTURE OF CARBONATE OF SODA, &c.

Specification forming part of Letters Patent No. 55,600, dated June 19, 1866.

*To all whom it may concern:*

Be it known that I, HAYDN M. BAKER, of Rochester, in the county of Monroe and State of New York, have invented new and useful Processes for the Manufacture of Carbonate and Bicarbonate of Soda, Muriatic Acid, and Caustic Lime; and I do hereby declare the following to be a full and exact description thereof, reference being had to the accompanying drawings, and to the letters of reference marked thereon.

The nature of my invention consists in the conversion of carbonate of magnesia into bicarbonate of magnesia by impregnating the same with carbonic acid, the acid being evolved from carbonate of lime (which may be in the form of chalk, marble, or oyster-shells) by decomposing the said lime-carbonate in a close vessel, which vessel is brought to a sufficiently elevated temperature therefor, and expelling the liberated carbonic acid therefrom with a volume of steam driven into the vessel containing the said carbonate of lime, and forcing the same into the vessel containing the carbonate of magnesia aforesaid, the whole being submitted to pressure, which may be the result of the expanded steam, or compression of the carbonic acid, or both.

The resulting product is bicarbonate of magnesia, while the product remaining in the retort or vessel, which contained carbonate of lime, is caustic lime, which may be applied to any industrial purpose to which it is adapted.

The bicarbonate of magnesia is now mixed with an equivalent proportion of chloride of sodium, (common salt,) whereby a double decomposition ensues, giving rise to bicarbonate of soda and chloride of magnesium, the bicarbonate of soda precipitating and the chloride of magnesium remaining in solution.

The chloride of magnesium is now transferred to a retort, and submitted to a sufficiently-elevated temperature to produce its decomposition, giving rise to muriatic acid, which is distilled out and condensed in the usual manner, and magnesia, which remains in the retort.

The magnesia is again converted into bicarbonate of magnesia, as previously described, and used in treating fresh quantities of salt.

If it be desired to transform the bicarbonate of soda into carbonate of soda, it is only necessary to heat the same to a temperature which will expel one equivalent of carbonic acid, which may be used in changing the magnesia left after the decomposition of chloride of magnesium into carbonate of magnesia.

To enable others skilled in the chemic art to make use of my invention, I will proceed to describe it more particularly.

I have a retort constructed like that represented in Figure 1, to which is attached appropriate apparatus for the admission of steam from the boiler, (represented also by Fig. 1,) or a rotary pump or force and suction pumps may be connected with the outlet of the retort, and the boiler and steam may be dispensed with. Into this retort I introduce an equivalent proportion of carbonate of lime, and apply sufficient heat to produce its decomposition and force the carbonic acid evolved from it into the vessel represented by Fig. 2, said vessel containing equivalent proportions of carbonate of magnesia, water, and chloride of sodium, the carbonate of magnesia becoming bicarbonate of magnesia. Double decomposition takes place rapidly under pressure, giving rise to chloride of magnesium and bicarbonate of soda, this latter precipitating, and liquid containing the chloride of magnesium, which may be run off into a distillatory apparatus and the muriatic acid distilled out, leaving oxide of magnesium (magnesia) in the retort, which may be again converted into bicarbonate of magnesia, as described above, and used in the treatment of fresh quantities of material. The muriatic acid is condensed in the usual manner.

The advantage of this invention is that it furnishes soda, (carbonate and bicarbonate,) muriatic acid, and caustic lime at very much more moderate rates than heretofore known, as all the products are residual products and of more value than either substance originally employed.

The following is a description of the several parts of the apparatus employed by me in the above-described process, with the exception of the distillatory apparatus, which is constructed in the usual manner, reference being had to the accompanying drawings, and the letters of reference marked thereon.

In the drawings, Fig. 1, letter A represents the chamber for the limestone. Letter B represents the charging-hopper. Letter C represents the discharging-hopper. Letters D D represent the doors to the hoppers B and C. Letters E E E E E E E represent fire-flues. Letter F represents the fire-room. Letter G represents the outlet for carbonic acid and steam. Letters H H represent the chamber to the boiler. Letters I I I represent the space between the boiler and retort. Letter J represents the safety-valve. Letter K represents a steam-pipe for conveying steam to retort. Letter L represents inlet of steam to retort. Letter M represents the grate in fire-room. Letter N represents the connection with chimney.

Fig. 2: Letter A represents the chamber for the reception of water, carbonic acid, carbonate of magnesia, and chloride of sodium. Letter B represents the safety-valve. Letter C represents the stop-cock for drawing off chloride of magnesia formed after the decomposition of chloride of sodium and bicarbonate of magnesia.

What I claim as my invention, and desire to secure by Letters Patent, is—

1. The application of the combined processes, as herein described, for the formation of carbonate and bicarbonate of soda, muriatic acid, and caustic lime, using for the said purposes the aforesaid carbonate of lime, carbonate of magnesia, and chloride of sodium in the manner herein set forth, or any other processes substantially the same and which will produce the same intended effects.

2. The construction and application of the boiler and lime-retort in combination, as herein described, and represented by the accompanying drawings, for the purposes duly set forth.

3. The application of heat and pressure without limitation in the process of forming bicarbonate of magnesia and subsequent double decomposition of chloride of sodium and bicarbonate of magnesia, forming chloride of magnesia and bicarbonate of soda.

HAYDN M. BAKER.

In presence of—
 DE L. CRITTENDEN,
 WM. RANKIN.